United States Patent
Zou

(10) Patent No.: US 12,045,284 B2
(45) Date of Patent: Jul. 23, 2024

(54) GEOMETRY-BASED DESIGN DATA SEARCH TOOL

(71) Applicant: Autodesk, Inc., San Rafael, CA (US)

(72) Inventor: Ping Zou, Shanghai (CN)

(73) Assignee: AUTODESK, INC., San Francisco, CA (US)

( * ) Notice: Subject to any disclaimer, the term of this patent is extended or adjusted under 35 U.S.C. 154(b) by 216 days.

(21) Appl. No.: 17/564,555

(22) Filed: Dec. 29, 2021

(65) Prior Publication Data

US 2023/0205820 A1    Jun. 29, 2023

(51) Int. Cl.
| | |
|---|---|
| G06F 16/901 | (2019.01) |
| G06F 16/25 | (2019.01) |
| G06F 16/53 | (2019.01) |
| G06F 30/20 | (2020.01) |
| G06F 111/20 | (2020.01) |

(52) U.S. Cl.
CPC ........ *G06F 16/9024* (2019.01); *G06F 16/258* (2019.01); *G06F 16/53* (2019.01); *G06F 30/20* (2020.01); *G06F 2111/20* (2020.01)

(58) Field of Classification Search
None
See application file for complete search history.

(56) References Cited

U.S. PATENT DOCUMENTS

| | | | |
|---|---|---|---|
| 10,296,626 B2 | 5/2019 | Haley et al. | |
| 2012/0020528 A1* | 1/2012 | Yamada | G06T 7/194 |
| | | | 382/106 |
| 2014/0129543 A1* | 5/2014 | Solheim | G06F 16/951 |
| | | | 707/711 |
| 2016/0147843 A1* | 5/2016 | Haley | G06F 16/9032 |
| | | | 707/722 |
| 2016/0371876 A1* | 12/2016 | McCombe | G06T 17/00 |
| 2020/0050710 A1* | 2/2020 | Shayani | G06N 20/00 |
| 2020/0410003 A1* | 12/2020 | Simhadri | G06F 16/9035 |
| 2022/0222208 A1* | 7/2022 | Sawyer | G06F 16/156 |

OTHER PUBLICATIONS

Bokeloh, M., et al., "Symmetry Detection Using Feature Lines", Eurographics 2009, pp. 697-706, vol. 28, No. 2.

\* cited by examiner

*Primary Examiner* — Yi Wang
(74) *Attorney, Agent, or Firm* — Gates & Cooper LLP

(57) ABSTRACT

A method and system provide for searching a computer-aided design (CAD) drawing. A CAD drawing is obtained and includes vector based geometric entities. For each entity, primitives are extracted and held in a graph with graph nodes that record entity paths. A feature coordinate system is created for each of the entities using the primitives. The primitives are transformed from a world coordinate system to feature coordinates of the feature coordinate system. Geometry data of the transformed entities is encoded into index codes that are utilized in an index table as keys with the graph nodes as values. A target geometric entity is identified and a target index code is determined and used to query the index table to identify instances of the target geometric entity in the CAD drawing. Found instances in the CAD drawing are displayed in a visually distinguishable manner.

22 Claims, 11 Drawing Sheets

GEOMETRY-BASED DESIGN DATA SEARCH TOOL

BACKGROUND OF THE INVENTION

1. Field of the Invention

The present invention relates generally to computer-aided design (CAD) applications, and in particular, to a method, apparatus, system, and article of manufacture for searching a drawing (or set of drawings) based on a specified set of geometries.

2. Description of the Related Art

When designing and working on projects (e.g., in architectural, engineering, construction, landscaping, etc.), it is often desirable to search for geometry within a CAD drawing. However, prior art systems fail to provide an effective geometry-based search method. Most of the existing search methods are based on entity properties or types. For example, to search or find matching geometry, prior art users are required to specify/define a well-defined block rather than native entities, and the same block is then searched. Such an approach is not flexible and has some obvious limitations. For example, a block that has the same geometry but a different name will be missed and non-block cases cannot be searched. In addition, prior art search targets that are a combination of blocks cannot be searched. Further to the above, alternative prior art systems may require a user to perform a manual search (to find all of the same geometric entities) by plotting out the drawing to paper.

In view of the above, it is desirable to provide an efficient, fast, and automated mechanism for searching geometric entities within one (or multiple) CAD drawings that is flexible enough to accommodate native entities, multiple blocks, and is not limited by a specified property/type/attribute.

SUMMARY OF THE INVENTION

Embodiments of the invention provide a new geometry-based search method that encodes geometry (i.e., geometric entities) into unique 64-bit codes that can be searched by leveraging the PCA (Principal Component Analysis) method.

Embodiments of the invention provide various novel aspects including:
  a unique and novel application of PCA to a collection of geometry primitives independent of orientation to generate a signature;
  a technique that is general to all 2D and 3D primitives based on point sampling;
  an index representation that is constructed for efficient matching;
  a parallelized algorithm for matching; and
  search capability across documents.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1A:
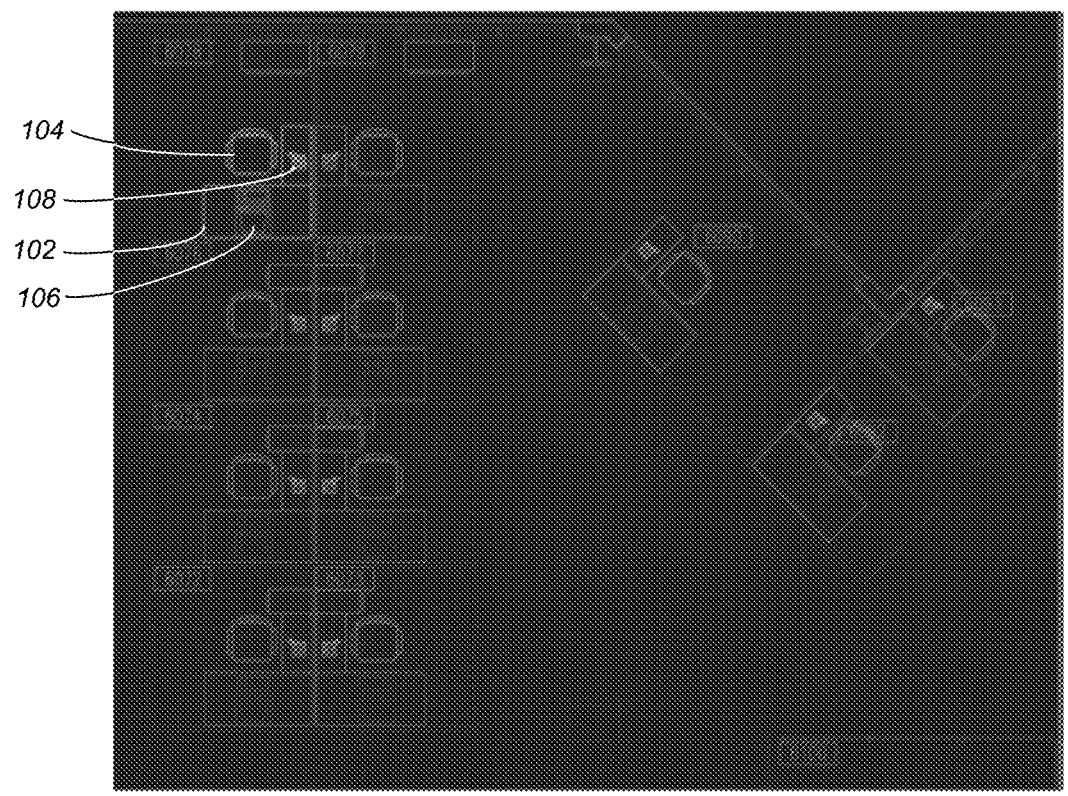
FIGS. 1A, 1B, 2A, and 2B illustrate exemplary searches that may be performed in accordance with one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention enable users to use entity geometry as a condition for an exact match search. The entities of search results have the same shape as the target entity but can have different scale, location, orientation, and mirror. The target may not only be a single entity, such as lines, curves, multi-segment lines, and so on, but may also be a composited entity, such as a group of selected entities, or a block that consists of multiple entities. Accordingly, the search result can be a single entity or a collection of entities existing anywhere in the drawing as long as they have the same shape as the target. A search target does not have to respect any entity grouping or structural constraints, for example, the search result can be a part of a block or may be a nested block. Furthermore, the search scope does not have to be limited to a single drawing but can be extended across drawings. An algorithm of embodiments of the invention is general for both two-dimensional (2D) and three-dimensional (3D) primitives as long as they can be point sampled uniquely. Further, an algorithm of embodiments of the invention is efficient and may be parallelizable. A search tool built in accordance with the invention may be high performance—usually only taking milliseconds to complete a search task.

Figure 1B:
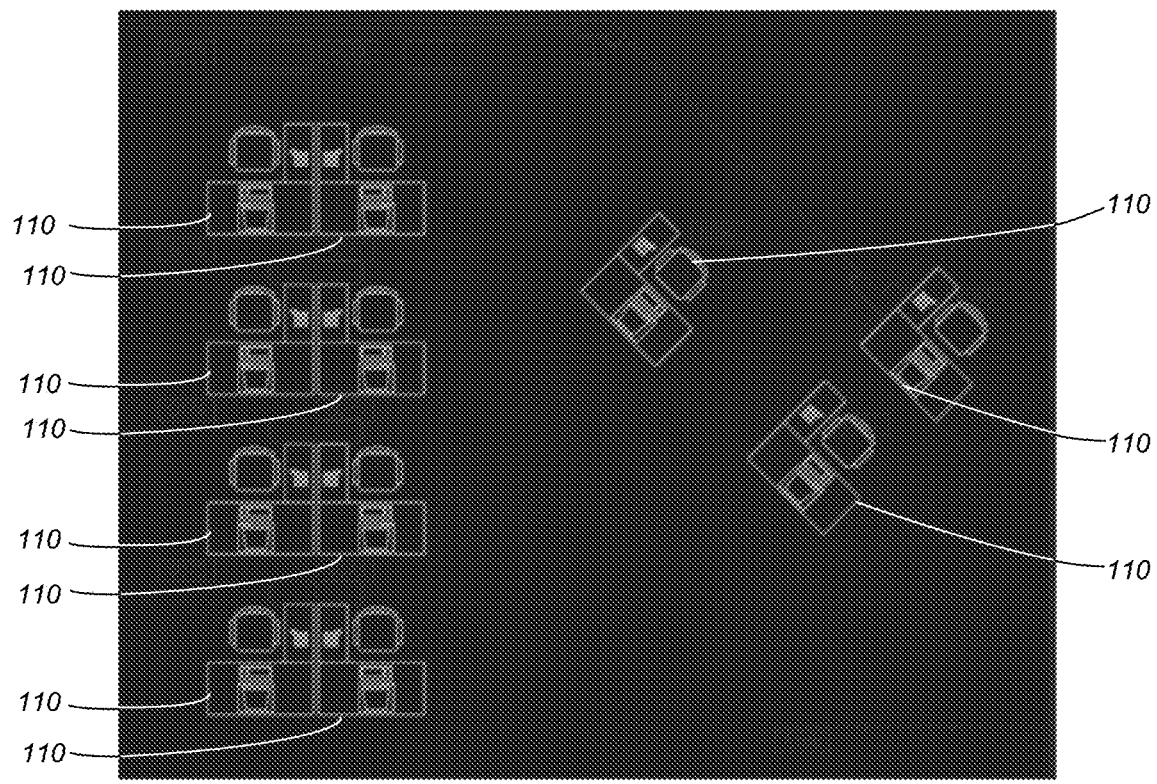

FIGS. 1A, 1B, 2A, and 2B illustrate exemplary searches that may be performed in accordance with one or more embodiments of the invention. In FIG. 1A, the user has elected to search for the combination of a table 102, chair 104, computer 106, and phone 108 within a given layout. FIG. 1B illustrates the result of the search with the instances 110 of the combination of entities 102-108 displayed in a visually distinguishable manner.

Figure 2A:
Figure 2B:
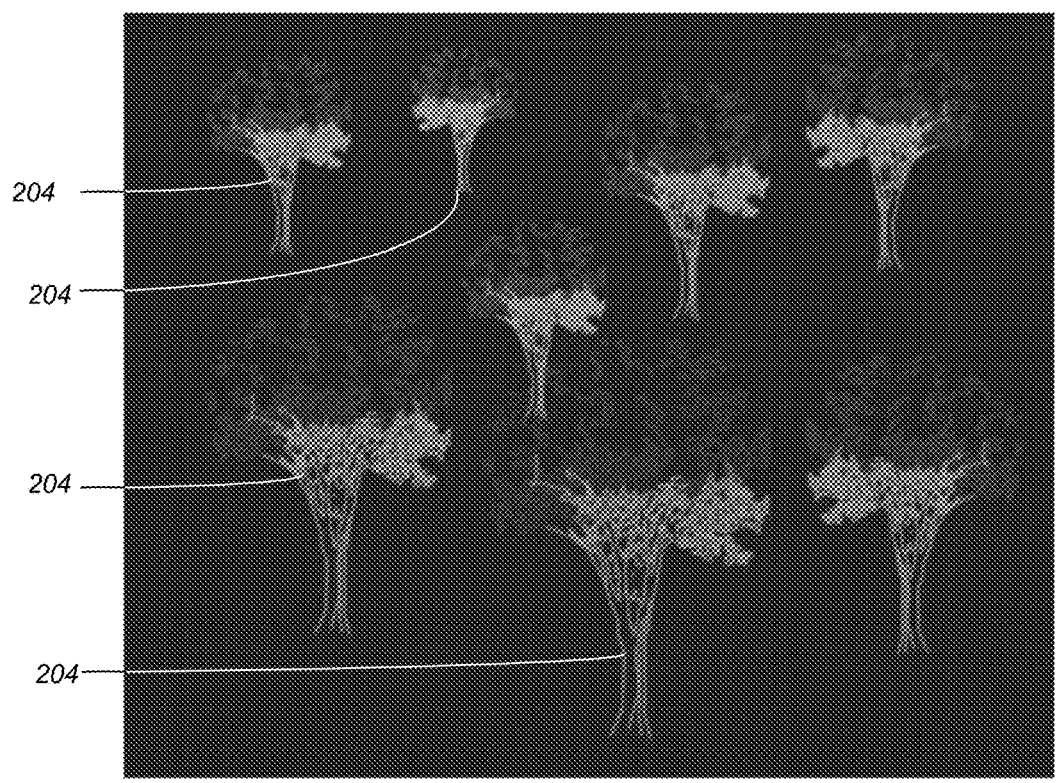

FIG. 2A illustrates the identification/selection of a part 202 of a tree/tree trunk to be used as the target of the search. FIG. 2B illustrates the results of the search with the found instances 204 displayed in a visually distinguishable manner.

In addition, or as an alternative to initiating a search and or finding results of a search in a visual manner, embodiment of the invention may also enable a search based on a count/number of found instances of a target geometry/entity. For example, in FIGS. 2A and 2B, the count would reveal that there are eight (8) found instances of the target geometry 202. Such a count may be displayed or presented to a user initiating the search.

Workflow Details

In embodiments of the invention, a geometry-based index table is generated and utilized to conduct the search of the drawing for an identified entity. Such an index table consists of a 64-bit binary code (a.k.a. an index code) that uniquely represents the geometry of the entity. The index code is generated by leveraging the PCA (Principal Component Analysis) method. The index code is only related to the geometry itself and is not dependent on a transformation, like scale, location, orientation, and mirror. In other words, the same index code corresponds to and has the same shape.

Based on the index table, embodiments of the invention enable a search of the CAD drawing (or a set of CAD drawings). There are at least two types of searches that may be conducted in accordance with embodiments of the invention: a search for a single entity and a search for a composited entity.

Figure 3A:
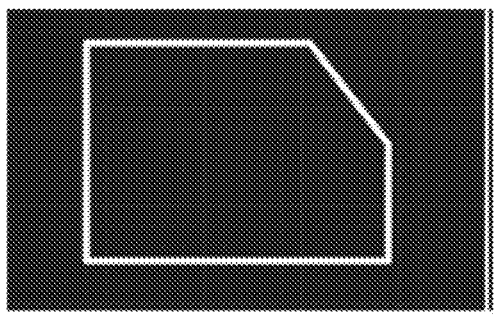
FIGS. 3A and 3B illustrate exemplary index codes of polylines with different shapes in accordance with one or more embodiments of the invention.
Figure 3B:
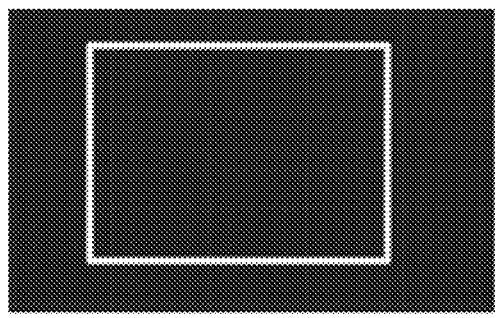

A search for a single entity may be performed by querying the table with the index code that comes from the single entity's geometry. FIGS. 3A and 3B illustrate exemplary index codes of polylines with different shapes in accordance with one or more embodiments of the invention. The text below the geometric entity lists the index code for each geometric entity in FIGS. 3A and 3B.

To search for a composited entity, a spatial tree is created for recording the relative positional relationship between entities in the space of the drawing. In that spatial tree, each entity is represented as a point that is placed at the local origin of the entity. With the spatial tree and the index table, the search algorithm finds out the entity that meets the criterion of geometry and position defined in the target collection. By looking for the entity one by one, the search algorithm achieves the ability to search composited entities (eventually).

The detailed implementation of the above-described workflow follows.

Extracting Geometric Information

To enable the search, geometric information for all entities in the drawing are extracted. No matter how complex the geometry shape of the entity, the entity will eventually be decomposed as a combination of basic primitives. These primitives are point, line, circle, ellipse, arc, curve, etc. In this stage, a graph is created to hold all primitives and their owner entity. That graph is used to determine the final search result by using the recorded entity path.

Figure 4:
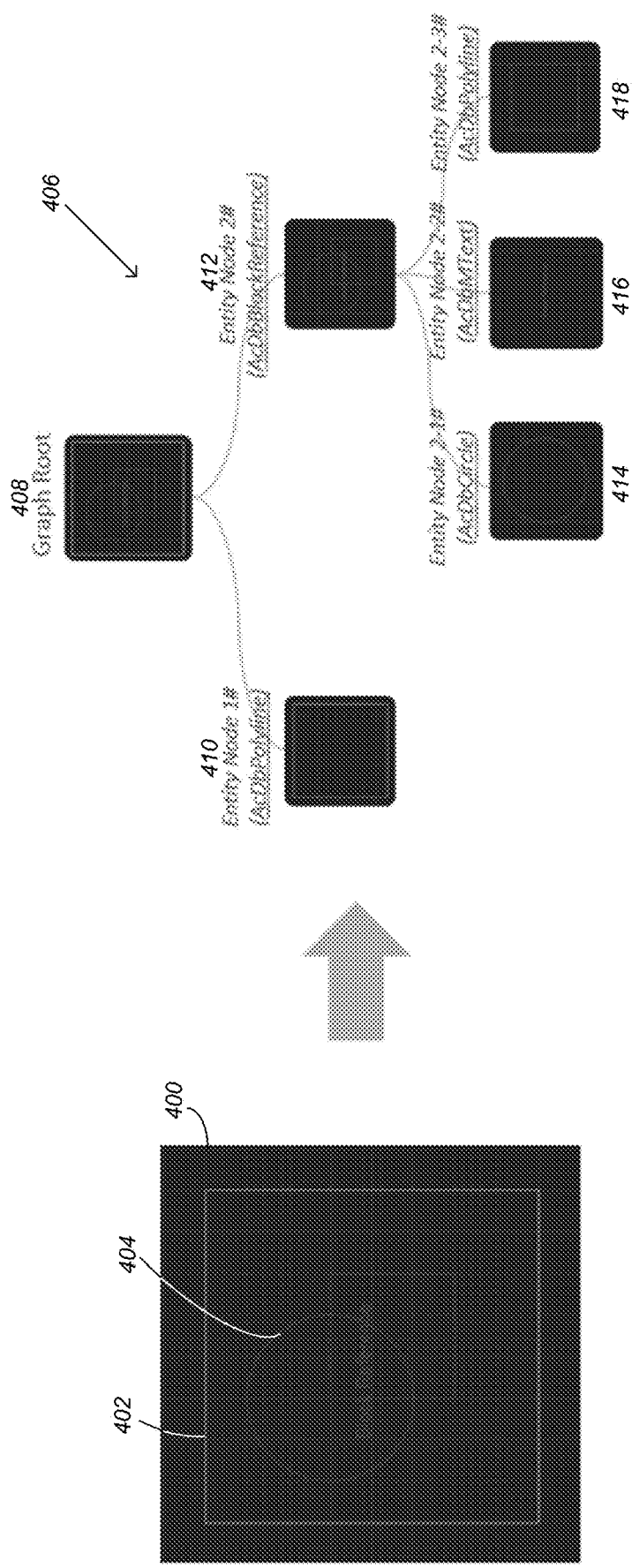
FIG. 4 illustrates an exemplary graph generated for a sample drawing that contains a polyline and a block in accordance with one or more embodiments of the invention.

FIG. 4 illustrates an exemplary graph generated for a sample drawing that contains a polyline and a block in accordance with one or more embodiments of the invention. As illustrated, the drawing 400 contains a polyline 402 and a block 404. The graph 406 includes the graph root node 408 that owns entity node 1 410 (for the polyline 402) and entity node 2 412 (for the block 404). The graph further reflects the children of block node 412 by nodes representing the geometric primitives of block 412. Thus, block node 412 has children nodes 414-418: node 414 for the circle, node 416 for the text "Block Reference", and node 418 for the polyline. Thus, the drawing 400 is represented by graph 406 with nodes for each of the basic geometric primitives (i.e., nodes 410 and 414-418) and the owner/parent entity (i.e., nodes 412 and 408) for each entity in the graph 406. Thus, the graph 406 provides a hierarchical graph tree structure with nodes having parents and children.

Creating a Feature Coordinate System

Figure 5A:
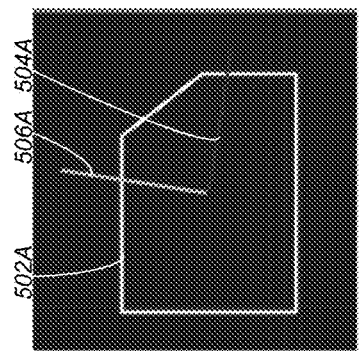
FIGS. 5A-5C illustrate different feature coordinates for different geometries in accordance with one or more embodiments of the invention.
Figure 5B:
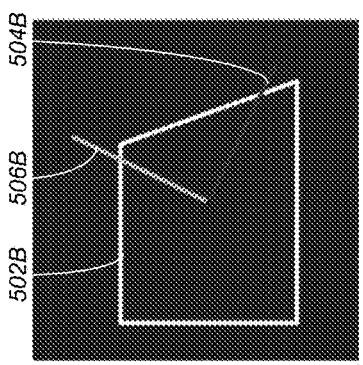
Figure 5C:
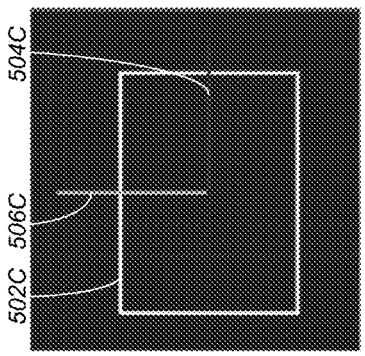

A feature coordinate system is created for each entity by using the extracted primitives. The origin and axis direction of the feature coordinate is determined by the geometry of the primitives, but independent of the transformation they have (i.e., transformations include scales, locations, orientations, and mirrors). FIGS. 5A-5C illustrate different feature coordinates for different geometries 502 (consisting of geometries 502A-502C) in accordance with one or more embodiments of the invention. The different feature coordinates consist of the x-axis 504 (i.e., axis 504A-504C), y-axis 506 (i.e., axis 506A-506C) and z-axis (not shown as the direction is directly out towards the viewer).

Figure 6:
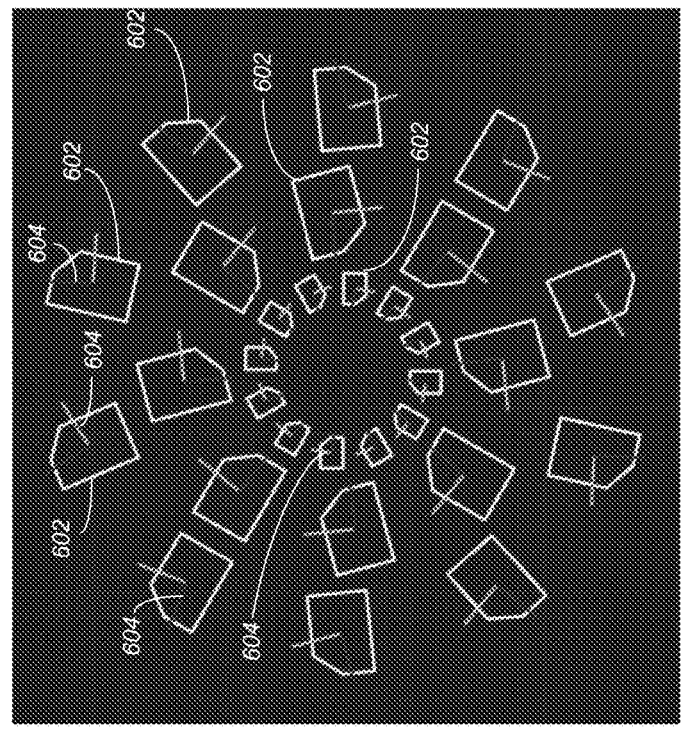
FIG. 6 illustrates a feature coordinate for the same geometry with different transformations in accordance with one or more embodiments of the invention.

FIG. 6 illustrates the same feature coordinate 604 for the same geometry 602 with different transformations. As illustrated, the geometry 602 is the same but may have different transformations via rotation and sizing. Nonetheless, the same feature coordinate 604 is used throughout.

The following steps describe the creation of a feature coordinate in more detail.

Determine Vertices

The vertices of all primitives extracted from the entity are determined/identified and put into the same collection. For primitives such as circles, arcs, and curves, the number of vertices are sampled at equal intervals (e.g., instead of merely retrieving the vertices).

Figure 7:
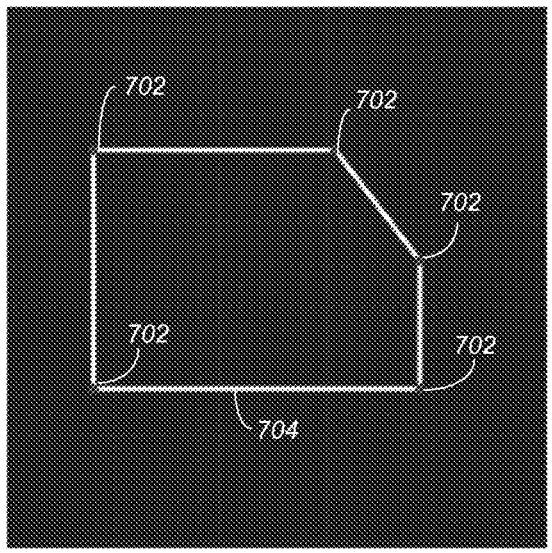
FIG. 7 illustrates vertices identified/determined on/from an exemplary polyline in accordance with one or more embodiments of the invention.

FIG. 7 illustrates the vertices 702 identified/determined on/from an exemplary polyline 704 in accordance with one or more embodiments of the invention.

Create Bounding Sphere

Figure 8:
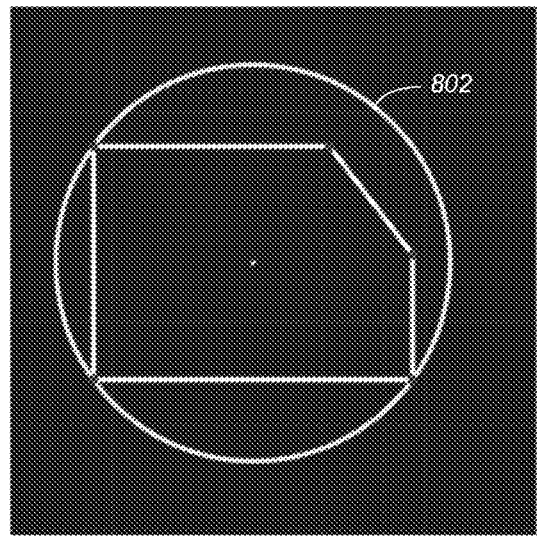
FIG. 8 shows a minimum bounding sphere that is created from the vertices of an exemplary polyline in accordance with one or more embodiments of the invention.

A minimum bounding sphere is created from the vertex collection. The center point of the sphere will be the origin of the feature coordinate, and the radius will be the scaling factor that is used for a transformation to normalize/make the size of primitives uniform for generating the index code. FIG. 8 shows the minimum bounding sphere 802 that is created from the vertices 702 of the exemplary polyline 704 (of FIG. 7) in accordance with one or more embodiments of the invention.

Determine Axis

The axis of the feature coordinate is determined by using the PCA (Principal Component Analysis) method. More specifically, the eigenvector of a covariance matrix of the vertex collection is determined and defines two directions for the feature coordinate. In this regard, the PCA method can provide the axis of the feature coordinates but may not be able to determine the axis direction independent of orientation. Consequently, different orientations may result in opposite axis directions even though the axis is the same. To determine a consistent axis direction, embodiments of the invention utilize a vector from the centroid of the vertex collection to the origin of the feature coordinate as a reference, which is independent of the orientation of the vertex collection. The x and y-axis directions are on the same side of that reference vector. Concretely, the dot product of the x and y-axis and the reference vector is a positive.

Figure 9:
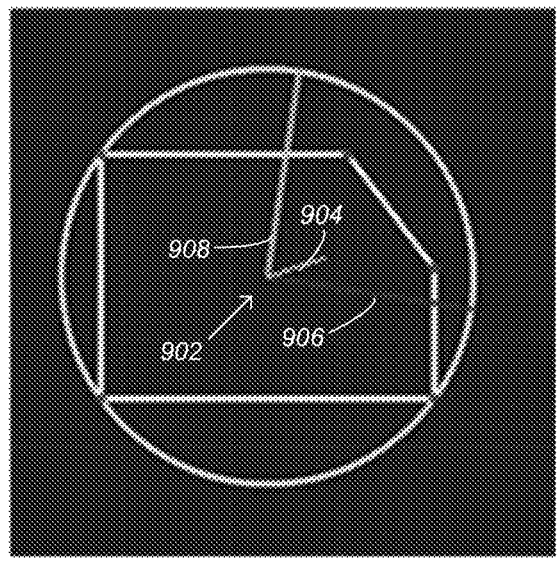
FIG. 9 illustrates a feature coordinate system that is created from vertices of an exemplary polyline based on a minimum bounding sphere and a PCA method in accordance with one or more embodiments of the invention.

FIG. 9 illustrates the feature coordinate system 902 that is created from the vertices 702 of the exemplary polyline 704 (of FIG. 7) based on the minimum bounding sphere 802 (of FIG. 8) and a PCA method in accordance with one or more embodiments of the invention. FIG. 9 also shows the relation between the reference vector 904, the x-axis 906, and the y-axis 908.

Transform Primitives to Feature Coordinates

With the feature coordinate system determined, all primitives of the entity are transformed from the world coordinate system to the feature coordinates. Further, the size is made uniform using the scaling factor (the radius of the minimum bounding sphere). After the transformation in this step, the primitives from the different entities with the same geometry will become the same, regardless of scale, location, orientation, and mirror. The geometry data of the transformed primitives are then encoded into 64-bit binary code, and combined to generate the index code.

Figure 10:
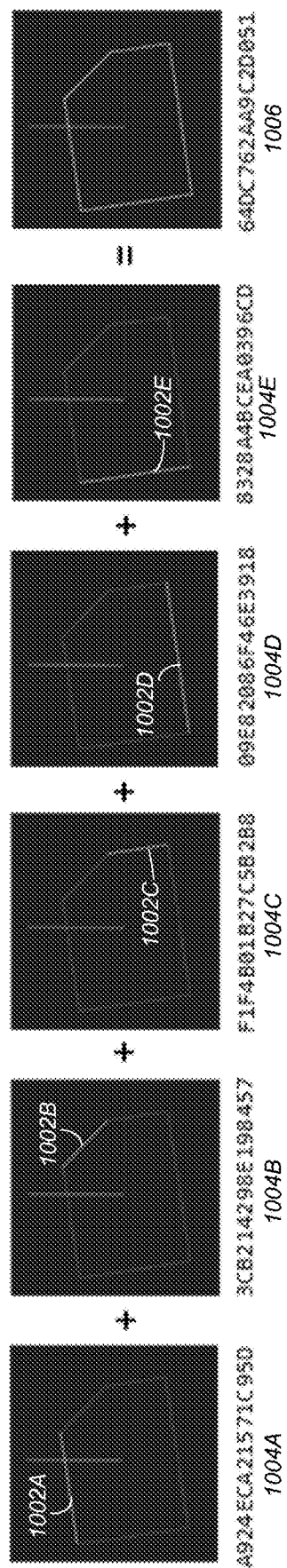
FIG. 10 shows how an index code is generated for an exemplary polyline in accordance with one or more embodiments of the invention.

FIG. 10 shows how the index code is generated for an exemplary polyline in accordance with one or more embodiments of the invention. As illustrated, e.g., segment 1002 (i.e., segments 1002A-1002E) of the polyline has a binary code 1004 (i.e., binary codes 1004A-1004E). To create the index code 1006 representative of the entire polyline, a simple addition of each binary code 1002 is conducted.

To compute each binary code, various hash functions may be utilized. In one or more embodiments the hash function utilizes is dependent on the parameters of each geometry primitive. The following provide various exemplary hash functions. Different or additional hash functions may be utilized in accordance with embodiments of the invention. For each hash function, a primitive type code is described and comprises an enum value for the unique identification of geometric types (e.g., eSegment, ePolyline, etc.). The parameters are transformed into the feature coordinate first, and are then hashed (e.g., pursuant the hash functions described below) and combined to generate the index code.

Segment

The parameters used for a segment primitive include the primitive type code of segment, start point and end point. The hash function for the index code may comprise:

Index Code=Combine(Hash(eSegment),Combine
(Hash(Start Point), Hash(End Point))+Combine
(Hash(End Point),Hash(Start Point)))

Polyline

The parameters used for the polyline primitive include the primitive type code of polyline and the collection of vertices (e.g., Vertex 0, Vertex 1, . . . , Vertex n). The hash function for the index code may comprise:

Index Code=Combine(Hash(ePolyline),Combine
(Hash(Vertex 1), Hash(Vertex 0))+Combine
(Hash(Vertex 0),Hash(Vertex 1))+ . . . +Combine(Hash(Vertex $n$),Hash(Vertex $n-1$))+
Combine(Hash(Vertex $n-1$), Hash(Vertex $n$)))

Circle

The parameters used for the circle primitive include the primitive type code of circle, the center, and the radius. The hash function for the index code may comprise:

Index Code=Combine(Hash(eCircle),Hash(Center),
Hash(Radius))

Circular Arc

The parameters used for the circular primitive include the primitive type code of circular arc, the start point, the middle point, the end point, and the radius. The hash function for the index code may comprise:

Index Code=Combine(Hash(eCircularArc),Hash(Radius), Combine(Hash(Start Point),Hash(Middle
Point),Hash(End Point))+Combine(Hash(End
Point),Hash(Middle Point),Hash(Start Point)))

Ellipse

The parameters used for the ellipse primitive include the primitive type code of ellipse, the center, the major radius, and the minor radius. The hash function for the index code may comprise:

Index Code=Combine(Hash(eEllipse),Hash(Center),
Hash(Major Radius), Hash(Minor Radius))

Elliptic Arc

The parameters used for the elliptic arc primitive include the primitive type code of elliptic arc, the start point, the middle point, the end point, the major radius, and the minor radius. The hash function for the index code may comprise:

Index Code=Combine(Hash(eEllipticArc),Hash(Major Radius),Hash(Minor Radius),Combine(Hash
(Start Point),Hash(Middle Point),Hash(End
Point))+Combine(Hash(End Point),Hash(Middle
Point),Hash(Start Point)))

Point

The parameters used for the point primitive include the primitive type code of point and the point of itself. The hash function for the index code may comprise:

Index Code=Combine(Hash(ePoint),Hash(Point))

Curve (for Splines)

The parameters used for the curve primitive include the primitive type code of curve, and 17 uniformly sampled points (i.e., Point 0, Point 1, . . . , Point 16). The hash function for the index code may comprise:

Index Code=Combine(Hash(eCurve),Combine(Hash
(Point 1),Hash(Point 0))+Combine(Hash(Point
0),Hash(Point 1))+ . . . +Combine(Hash(Point
16), Hash(Point 15))+Combine(Hash(Point 15),
Hash(Point 16)))

Polygon (for Faces)

The parameters used for the polygon primitive include the primitive type code of polygon and the collection of vertices (i.e., Vertex 0, Vertex 1, . . . , Vertex n). The hash function for the index code may comprise:

Index Code=Combine(Hash(ePolygon),Combine
(Hash(Vertex 1), Hash(Vertex 0))+Combine (Hash(Vertex 0),Hash(Vertex 1))+ . . . +Combine(Hash(Vertex 0),Hash(Vertex n))+Combine(Hash(Vertex n),Hash(Vertex 0)))

Create Index Table

An index table is created that consists of the index codes generated above as keys and the graph nodes created above as values.

Search for Geometric Entity

With the index table, searching a single entity based on geometry is conducted by querying the index table for graph nodes with the index code acquired/generated from the target entity. The search result is the entity path that is recorded in the graph node.

Figure 11:
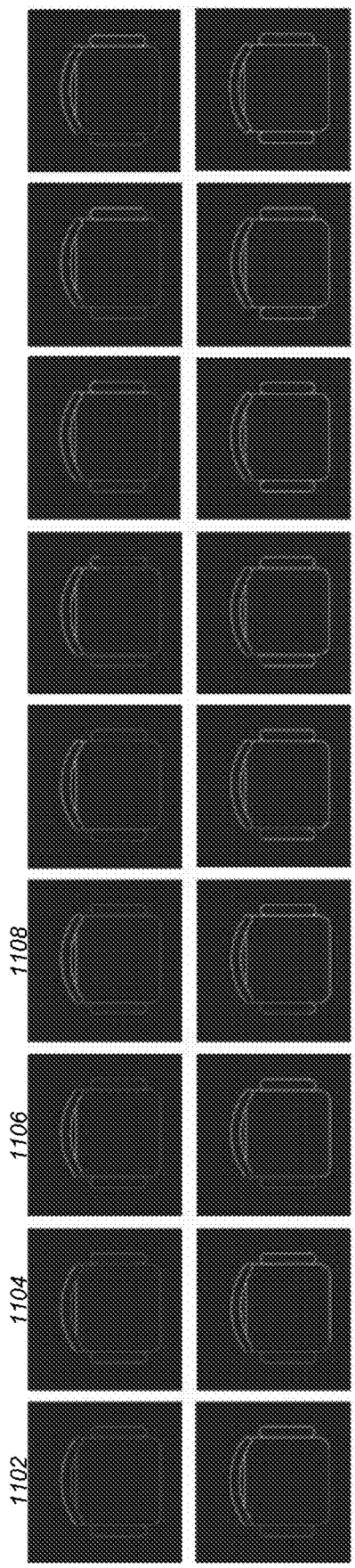
FIG. 11 shows an example of a search path for a chair block which contains eighteen (18) steps in accordance with one or more embodiments of the invention.

To search a composited entity, like a block that consists of multiple entities, the search process is broken down into multiple steps per entity. In that process, a search path determines the search sequence of the entity. FIG. 11 shows an example of the search path for a chair block that contains eighteen (18) steps (looking for one geometric entity per step). As illustrated, each step (traversing horizontally first and then proceeding to the second row) adds an additional geometric entity to the search. For example, the search begins at 1102 for a circular arc, and proceeds to 1104 for a segment/line, to 1106 for an additional circular arc, to 1108 for another circular arc, etc.

Each step on the search path is to find the entity that meets the criteria of geometry, position, size, and rotation. The search process returns success only when all entities on the search path are found. The following steps describe how to quickly find the matched entity for each step in the search path:

Find Initial Matching Geometry

Figure 12:
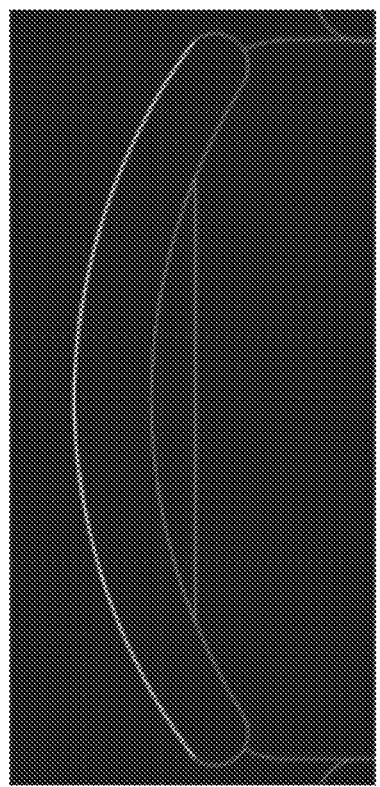
FIG. 12 illustrates an exemplary arc entity (the back of a chair) that is found as the first entity of a potential result that meets the criteria of the search path in accordance with one or more embodiments of the invention.

The index table is queried/searched to find all entities that match with the geometry of the first target entity in the search path. Each found entity will be the beginning of a potential result path. FIG. 12 illustrates an exemplary arc entity (the back of a chair) that is found as the first entity of a potential result that meets the criteria of the search path.

Find Candidate Entities in Search Path

Figure 13C:
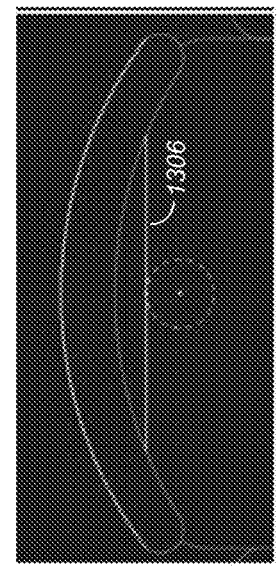
FIGS. 13A-C demonstrates how to locate the potential candidate of the next entity on the search path in accordance with one or more embodiments of the invention.
Figure 13B:
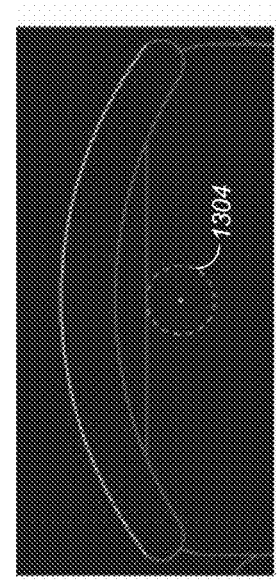
Figure 13A:
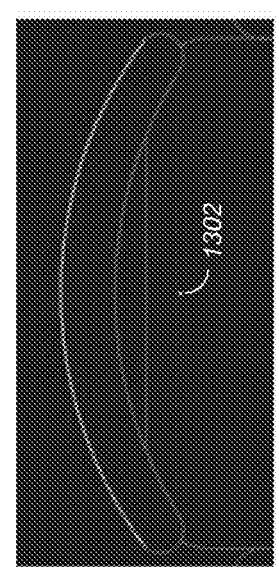

The process continues by finding the candidate entity that matches with the entity in the next step along the search path. To quickly find the potential candidate entity, the search algorithm calculates the possible range based on the current entity's origin and queries a spatial tree to find all entities that meet the criteria of distance and geometry of the entity in the next step. FIGS. 13A-C demonstrate how to locate the potential candidate of the next entity on the search path in accordance with one or more embodiments of the invention. As illustrated, the entity's origin 1302 is identified and a range 1304 is determined (e.g., based on a radius from the origin 1302). All entities that meet the criteria of distance and geometry of the entity are identified (i.e., resulting in identifying entity 1306 as its origin is on the circle 1304 meaning that it meets the criteria of distance, and its index code matches the target entity as well).

Verify Size and Rotation Criteria

Figure 14:
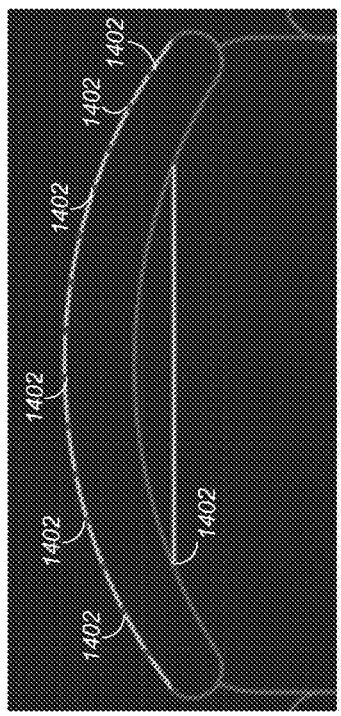
FIG. 14 shows an example of which vertices of composited entities are collected for calculating the feature code in accordance with one or more embodiments of the invention.

Given the potential candidate entity (i.e., entity 1306) that has been found which meets the criteria of distance and geometry for the next entity, the potential candidate entity still needs to be verified that it meets the criteria of size and rotation. To make that verification, a 64-bit binary code called "feature code" (also referred to as binary code herein) is calculated out by leveraging the PCA method with the vertices from both the candidate entity and the current entity that has been determined in the previous step. The value of feature code is the eigenvalue of the covariance matrix of the vertex collection that multiplies the square of scaling, which is used to determine if the shape of composited entities match with the target shape in the search path. FIG. 14 shows an example of which vertices 1402 of composited entities are collected for calculating the feature code in accordance with one or more embodiments of the invention.

Determine all Entities on Search Path

The (i) search/finding of candidate entities and (ii) verification of size and rotation criteria steps above are repeated until all entities on the search path have been determined. Each step is based on the success of the previous step. Once any step cannot find the satisfied entity, the search process will be aborted.

Figure 15:
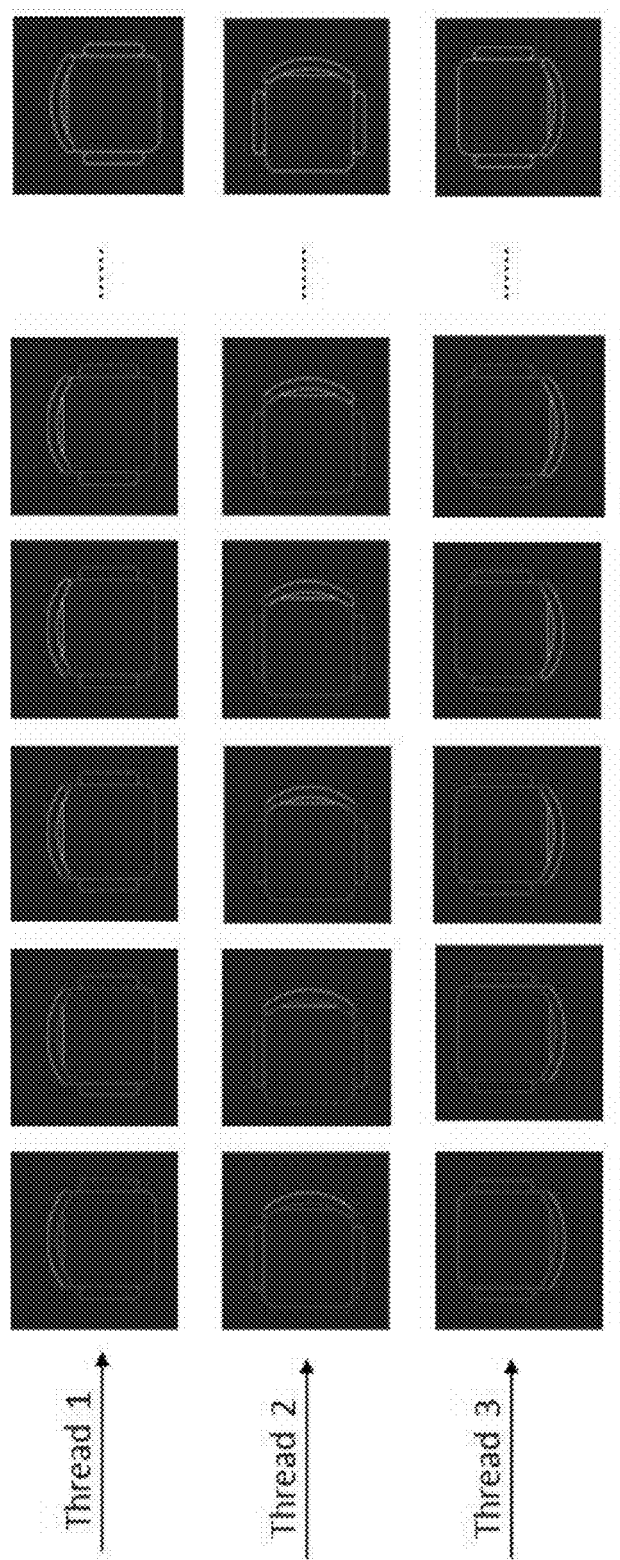
FIG. 15 shows the concept of a parallel search with multipotential results in accordance with one or more embodiments of the invention.

In addition, the number of initial candidate entities found may determine the number of search jobs that can be processed in parallel. Each search job can run in its working thread independently of other search jobs. FIG. 15 shows the concept of a parallel search with multipotential results in accordance with one or more embodiments of the invention. As illustrated each thread (i.e., thread 1, thread 2, thread 3, etc.) may begin with the initial candidate entity that has been identified and continues until all entities on the search path have been identified/found (or until an entity on the search path is not found at which time the search thread will be aborted). Further parallel threads may be executed for each candidate entity along a search path.

Logical Flow

Figure 16:
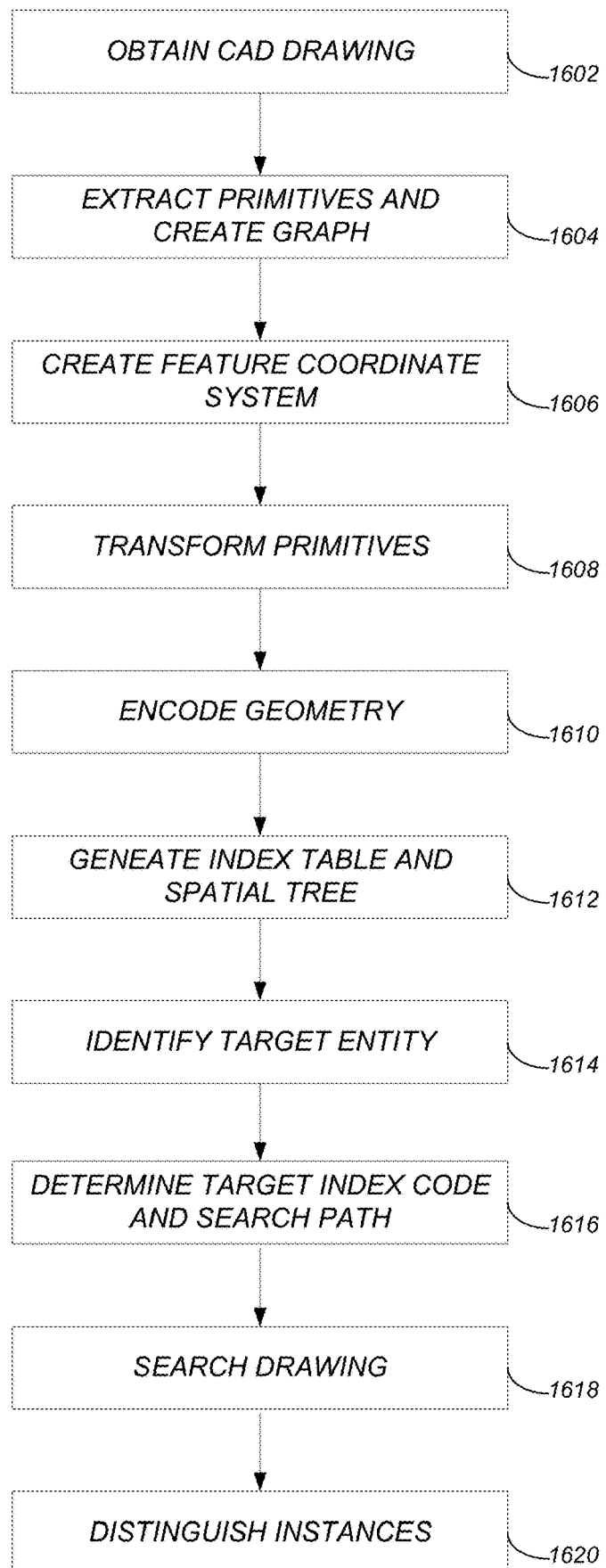
FIG. 16 illustrates the logical flow for searching a CAD drawing for a geometric entity in accordance with one or more embodiments of the invention.

FIG. 16 illustrates the logical flow for searching a CAD drawing for a geometric entity in accordance with one or more embodiments of the invention.

At step 1602, the CAD drawing is obtained. The CAD drawing includes one or more geometric entities that are vector based geometric entities.

At step 1604, for each of the one or more geometric entities, one or more primitives are extracted and a graph is created. The graph holds the geometric entity and all of the one or more primitives owned by that geometric entity. Further, each graph node of the graph records an entity path. The one or more primitives may consist of a point, a line, a circle, an ellipse, an arc, polyline, curve (spline), polygon (faces), etc.

At step 1606, a feature coordinate system is created for each of the one or more geometric entities using the one or more primitives. An origin and axis direction of the feature coordinate system may be determined by a geometry of the one or more primitives. Further, each feature coordinate system may be independent of a transformation of the one or more primitives.

To create the feature coordinate system, various steps may be performed for each of the one or more geometric entities. Such steps may include acquiring vertices for all of the one or more primitives extracted from the geometric entity, placing the vertices into a vertex collection, creating a minimum bounding sphere from the vertex collection, and determining an x/y/z axis of the feature coordinate system. In this regard, in acquiring the vertices for each primitive that is a circle, arc or curve, a number of vertices may be sampled at equal intervals. In one or more embodiments, for the bounding sphere, the center point of the minimum bounding sphere may be an origin of the feature coordinate system, and the radius of the minimum bounding sphere may be a scaling factor that is used during the transforming. In one or more embodiments the axis of the feature coordinate system may be determined using principal component analysis (PCA) that is based on an eigenvector of a covariance matrix of the vertex collection. Further, in such embodiments, the PCA may use a vector as a reference that is created from a centroid of the vertex collection to an origin of the feature coordinate to decide an axis direction.

At step 1608, all of the one or more primitives, for all of the one or more geometric entities, are transformed from a world coordinate system to feature coordinates of the feature coordinate system. The transforming includes making a size of all of the one or more primitives uniform.

At step 1610, for each of the one or more geometric entities, geometry data of the transformed one or more primitives that are owned by a respective geometric entity are encoded into an index code for the respective geometric entity. Such encoding may include encoding the geometry data into a 64-bit binary feature code. Thereafter, the encoded geometry data (i.e., the binary feature codes) may be combined (e.g., added together) to generate the index code.

At step 1612, an index table is generated and includes the index codes as keys and graph nodes of the graph as values. In addition, a spatial tree may be created to record the relative positional relationship between entities in the drawing space. Such a spatial tree accelerates the search of the composited entity.

At step 1614, a target geometric entity of the one or more geometric entities is identified.

At step 1616, a target index code (of the index codes) is determined for the target geometric entity. In addition, a search path may be determined for the search sequence of the target entities.

At step 1618, the CAD drawing is searched to identify instances of the target geometric entity by querying the index table based on the target index code. The searching may be for a single entity or a multiple/composited entity. If searching for a single geometric entity, the index table may be queried using the target index code to identify relevant graph nodes. Thereafter, the query search results are provided and may consist of the entity paths recorded in the relevant graph nodes.

If the search is for a composited target geometric entity (consisting of multiple target geometric entities), multiple steps may be required to perform the search. In a first step, a search path is determined that consists of multiple steps that define a search sequence of the composited target geometric entity. Next, each of the multiple steps searches (in parallel threads if desired) for one of the multiple target geometric entities of the composited target geometric entity. For a current geometric entity of the multiple target geometric entities, each of the multiple steps searches by:

(A) Querying the index table to find all instances of the current geometric entity (i.e., the first geometric entity in the search path), wherein each found instance provides a beginning of a potential result path;

(B) Searching for potential candidate geometric entities that match the target geometric entity in the next step of the potential result path. The searching for the potential candidate geometric entities may include calculating a range based on an origin of the current geometric entity, and querying a spatial tree to find all geometric entities that meet criteria of distance and geometry of the target geometric entity in the next step (wherein all geometric entities that meet the criteria are considered potential candidate geometric entities);

(C) For each of the potential candidate geometric entities, verifying whether it meets criteria of size and rotation (e.g., by calculating a feature code that is based on principal component analysis (PCA) and vertices from both the potential candidate geometric entity and the current geometric entity); and (D) Repeating steps (B) and (C) until all geometric entities on the search path and all potential result paths have been determined. In one or more embodiments, the searching aborts and a potential result path is considered nonviable when a potential candidate geometric entity that satisfies the criteria cannot be found.

At step 1620, the identified instances of the target geometric entity are visually distinguished within the CAD drawing (e.g., highlighted, displayed in a different color, bolded, etc.).

Hardware Environment

Figure 17:
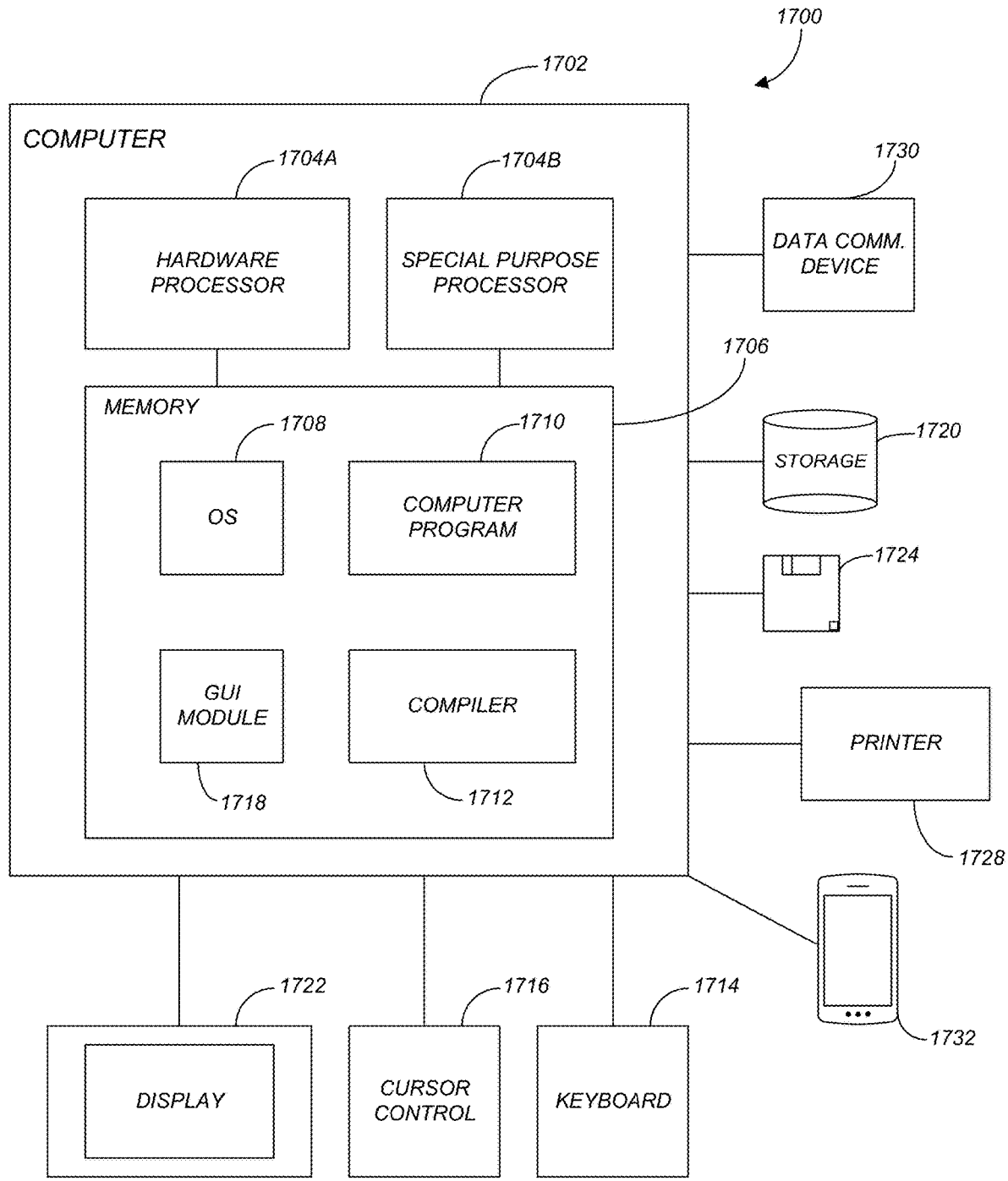
FIG. 17 is an exemplary hardware and software environment used to implement one or more embodiments of the invention.

FIG. 17 is an exemplary hardware and software environment 1700 (referred to as a computer-implemented system and/or computer-implemented method) used to implement one or more embodiments of the invention. The hardware and software environment includes a computer 1702 and may include peripherals. Computer 1702 may be a user/client computer, server computer, or may be a database computer. The computer 1702 comprises a hardware processor 1704A and/or a special purpose hardware processor 1704B (hereinafter alternatively collectively referred to as processor 1704) and a memory 1706, such as random access memory (RAM). The computer 1702 may be coupled to, and/or integrated with, other devices, including input/output (I/O) devices such as a keyboard 1714, a cursor control device 1716 (e.g., a mouse, a pointing device, pen and tablet, touch screen, multi-touch device, etc.) and a printer 1728. In one or more embodiments, computer 1702 may be coupled to, or may comprise, a portable or media viewing/listening device 1732 (e.g., an MP3 player, IPOD, NOOK, portable digital video player, cellular device, personal digital assistant, etc.). In yet another embodiment, the computer 1702 may comprise a multi-touch device, mobile phone, gaming system, internet enabled television, television set top box, or other internet enabled device executing on various platforms and operating systems.

In one embodiment, the computer 1702 operates by the hardware processor 1704A performing instructions defined by the computer program 1710 (e.g., a computer-aided design [CAD] application) under control of an operating system 1708. The computer program 1710 and/or the operating system 1708 may be stored in the memory 1706 and may interface with the user and/or other devices to accept input and commands and, based on such input and commands and the instructions defined by the computer program 1710 and operating system 1708, to provide output and results.

Output/results may be presented on the display 1722 or provided to another device for presentation or further processing or action. In one embodiment, the display 1722 comprises a liquid crystal display (LCD) having a plurality of separately addressable liquid crystals. Alternatively, the display 1722 may comprise a light emitting diode (LED) display having clusters of red, green and blue diodes driven together to form full-color pixels. Each liquid crystal or pixel of the display 1722 changes to an opaque or translucent state to form a part of the image on the display in response to the data or information generated by the processor 1704 from the application of the instructions of the computer program 1710 and/or operating system 1708 to the input and commands. The image may be provided through a graphical user interface (GUI) module 1718. Although the GUI module 1718 is depicted as a separate module, the instructions performing the GUI functions can be resident or distributed in the operating system 1708, the computer program 1710, or implemented with special purpose memory and processors.

In one or more embodiments, the display 1722 is integrated with/into the computer 1702 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

Some or all of the operations performed by the computer 1702 according to the computer program 1710 instructions may be implemented in a special purpose processor 1704B. In this embodiment, some or all of the computer program 1710 instructions may be implemented via firmware instructions stored in a read only memory (ROM), a programmable read only memory (PROM) or flash memory within the special purpose processor 1704B or in memory 1706. The special purpose processor 1704B may also be hardwired through circuit design to perform some or all of the operations to implement the present invention. Further, the special purpose processor 1704B may be a hybrid processor, which includes dedicated circuitry for performing a subset of functions, and other circuits for performing more functions such as responding to computer program 1710 instructions. In one embodiment, the special purpose processor 1704B is an application specific integrated circuit (ASIC).

The computer 1702 may also implement a compiler 1712 that allows an application or computer program 1710 written in a programming language such as C, C++, Assembly, SQL, PYTHON, PROLOG, MATLAB, RUBY, RAILS, HASKELL, or other language to be translated into processor 1704 readable code. Alternatively, the compiler 1712 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 1710 accesses and manipulates data accepted from I/O devices and stored in the memory 1706 of the computer 1702 using the relationships and logic that were generated using the compiler 1712.

The computer 1702 also optionally comprises an external communication device such as a modem, satellite link, Ethernet card, or other device for accepting input from, and providing output to, other computers 1702.

In one embodiment, instructions implementing the operating system 1708, the computer program 1710, and the compiler 1712 are tangibly embodied in a non-transitory computer-readable medium, e.g., data storage device 1720, which could include one or more fixed or removable data storage devices, such as a zip drive, floppy disc drive 1724, hard drive, CD-ROM drive, tape drive, etc. Further, the operating system 1708 and the computer program 1710 are comprised of computer program 1710 instructions which, when accessed, read and executed by the computer 1702, cause the computer 1702 to perform the steps necessary to implement and/or use the present invention or to load the program of instructions into a memory 1706, thus creating a special purpose data structure causing the computer 1702 to operate as a specially programmed computer executing the method steps described herein. Computer program 1710 and/or operating instructions may also be tangibly embodied in memory 1706 and/or data communications devices 1730, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 1702.

Figure 18:
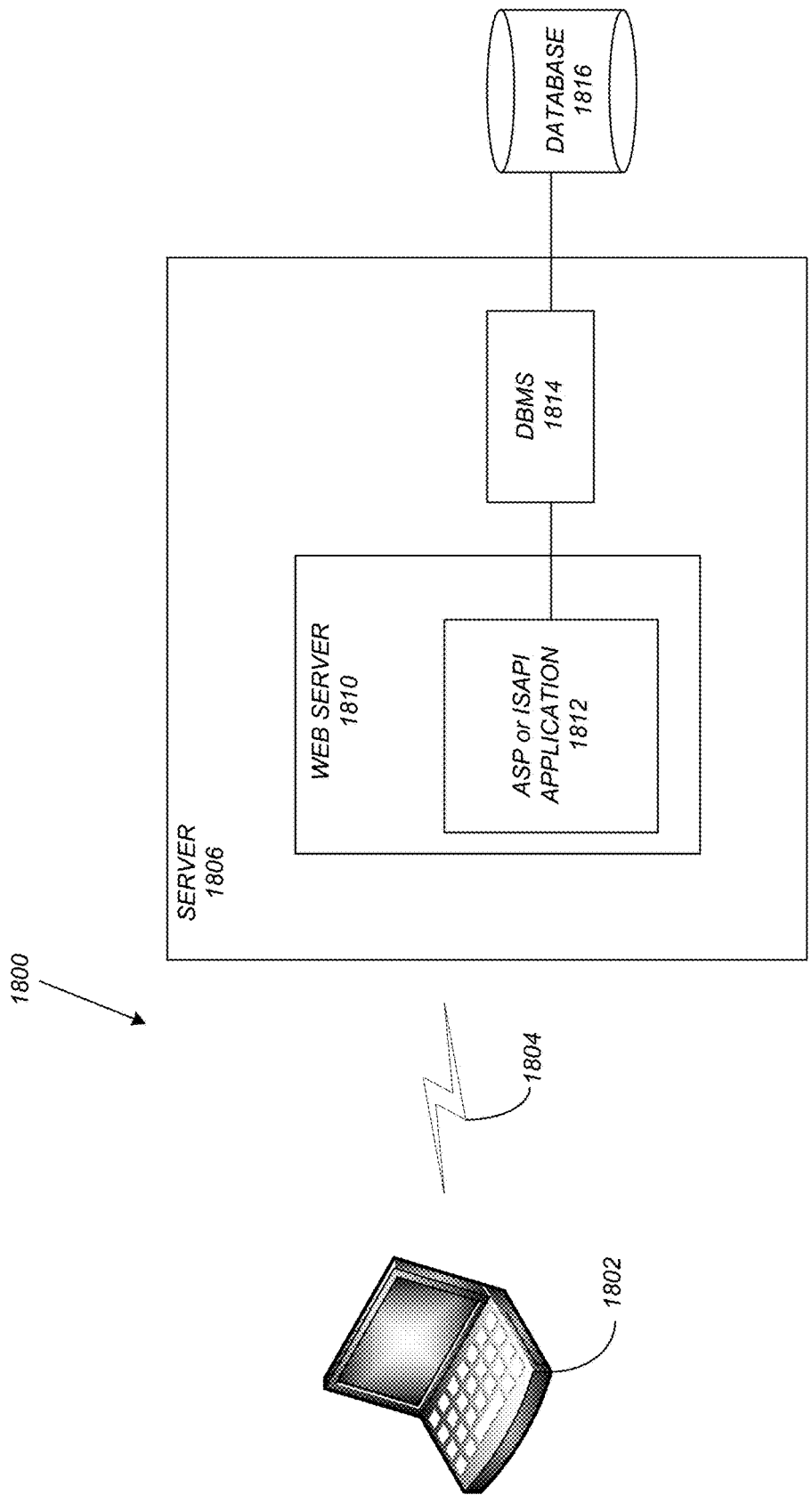
FIG. 18 schematically illustrates a typical distributed/cloud-based computer system in accordance with one or more embodiments of the invention.

FIG. 18 schematically illustrates a typical distributed/cloud-based computer system 1800 using a network 1804 to connect client computers 1802 to server computers 1806. A typical combination of resources may include a network 1804 comprising the Internet, LANs (local area networks), WANs (wide area networks), SNA (systems network architecture) networks, or the like, clients 1802 that are personal computers or workstations (as set forth in FIG. 17), and servers 1806 that are personal computers, workstations, minicomputers, or mainframes (as set forth in FIG. 17). However, it may be noted that different networks such as a cellular network (e.g., GSM [global system for mobile communications] or otherwise), a satellite based network, or any other type of network may be used to connect clients 1802 and servers 1806 in accordance with embodiments of the invention.

A network 1804 such as the Internet connects clients 1802 to server computers 1806. Network 1804 may utilize ethernet, coaxial cable, wireless communications, radio frequency (RF), etc. to connect and provide the communication between clients 1802 and servers 1806. Further, in a cloud-based computing system, resources (e.g., storage, processors, applications, memory, infrastructure, etc.) in clients 1802 and server computers 1806 may be shared by clients 1802, server computers 1806, and users across one or more networks. Resources may be shared by multiple users and can be dynamically reallocated per demand. In this regard, cloud computing may be referred to as a model for enabling access to a shared pool of configurable computing resources.

Clients 1802 may execute a client application or web browser and communicate with server computers 1806 executing web servers 1810. Such a web browser is typically a program such as MICROSOFT INTERNET EXPLORER/EDGE, MOZILLA FIREFOX, OPERA, APPLE SAFARI, GOOGLE CHROME, etc. Further, the software executing on clients 1802 may be downloaded from server computer 1806 to client computers 1802 and installed as a plug-in or ACTIVEX control of a web browser. Accordingly, clients 1802 may utilize ACTIVEX components/component object model (COM) or distributed COM (DCOM) components to provide a user interface on a display of client 1802. The web server 1810 is typically a program such as MICROSOFT'S INTERNET INFORMATION SERVER.

Web server 1810 may host an Active Server Page (ASP) or Internet Server Application Programming Interface (ISAPI) application 1812, which may be executing scripts. The scripts invoke objects that execute business logic (referred to as business objects). The business objects then manipulate data in database 1816 through a database management system (DBMS) 1814. Alternatively, database 1816 may be part of, or connected directly to, client 1802 instead of communicating/obtaining the information from database 1816 across network 1804. When a developer encapsulates the business functionality into objects, the system may be referred to as a component object model (COM) system. Accordingly, the scripts executing on web server 1810

(and/or application 1812) invoke COM objects that implement the business logic. Further, server 1806 may utilize MICROSOFT'S TRANSACTION SERVER (MTS) to access required data stored in database 1816 via an interface such as ADO (Active Data Objects), OLE DB (Object Linking and Embedding DataBase), or ODBC (Open DataBase Connectivity).

Generally, these components 1800-1816 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 1802 and 1806 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 1802 and 1806. Embodiments of the invention are implemented as a software/CAD application on a client 1802 or server computer 1806. Further, as described above, the client 1802 or server computer 1806 may comprise a thin client device or a portable device that has a multi-touch-based display.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In view of the above, embodiments of the invention find all matched objects in a drawing (or across drawings) that contain the object that have the same geometry as the target object. Furthermore, embodiments of the invention support searching composited objects. In addition, as a geometry support tool, embodiments of the invention supports multiple characteristics of geometry data, including rotation, scale, and mirror, as options for searching for the matched object including such transformations that have been applied to such matched objects. Further to the above, embodiments of the invention encode geometry data into a unique 64-bit code by leverage PCA and a minimum enclosing sphere. In this regard, two codes can simply be compared to detect duplicates and there is no need to utilize KNN (K-nearest neighbors algorithm) to accelerate detection.

Embodiments of the invention also process and compare low-level primitive objects thereby enabling the ability to cross the boundary of a component to search elements inside, such as within blocks, nested or separated blocks. Accordingly, the search of embodiments of the invention enables the ability to find a matched group of (multiple) geometry(ies) with a given pattern. To enable such a capability, embodiments of the invention utilize a search path that determines the search sequence of geometry (and finding all matching groupings along this search path). To accelerate processing, embodiments of the invention may utilize a spatial tree that is used to find the geometry of the next step (in the search path) with very low delays. In addition, a feature code is calculated for the geometries that come from the adjacent two steps. This feature code may then be used to measure if the geometries meet the criteria of rotation, scale, and mirror within the search path. It may be noted in that in one or more embodiments, the search criteria can be disabled for scale and mirror images. However, in one or more alternative embodiments, the criteria of orientation and location may not be disabled (because it is the exact same shape/geometry).

Further to the above, embodiments of the invention are efficient and parallelizable. By enabling the use of multiple threads, very low search delays in a very big drawing are supported and delays are usually at the milliseconds level and can support real-time searching while a drawing is being edited. In this regard, all of the steps described herein can be performed dynamically in real-time as the drawing is being edited (with many of the steps being performed autonomously (i.e., without additional user input)).

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for searching a computer-aided design (CAD) drawing, comprising:
    (a) obtaining the CAD drawing, wherein:
        (i) the CAD drawing comprises one or more geometric entities; and
        (ii) the one or more geometric entities comprise vector based geometric entities;
    (b) for each of the one or more geometric entities:
        (i) extracting one or more primitives;
        (ii) creating a graph that holds the geometric entity and all of the one or more primitives owned by that geometric entity, wherein each graph node of the graph records an entity path;
    (c) creating a feature coordinate system for each of the one or more geometric entities using the one or more primitives;
    (d) transforming all of the one or more primitives, for all of the one or more geometric entities, from a world coordinate system to feature coordinates of the feature coordinate system, wherein the transforming further comprises making a size of all of the one or more primitives uniform;
    (e) encoding, for each of the one or more geometric entities, geometry data of the transformed one or more primitives that are owned by a respective geometric entity, into an index code for the respective geometric entity;
    (f) generating an index table comprising the index codes as keys and graph nodes of the graph as values;
    (g) identifying a target geometric entity of the one or more geometric entities;
    (h) determining, for the target geometric entity, a target index code of the index codes;

(i) searching the CAD drawing to identify instances of the target geometric entity by querying the index table based on the target index code; and
(j) visually distinguishing the identified instances of the target geometric entity in the CAD drawing.

2. The computer-implemented method of claim 1, wherein the one or more primitives comprise:
   a point;
   a line;
   a circle;
   an ellipse;
   an arc;
   a polyline;
   a curve; or
   a polygon.

3. The computer-implemented method of claim 1, wherein:
   an origin and axis direction of the feature coordinate system is determined by a geometry of the one or more primitives; and
   each feature coordinate system is independent of a transformation of the one or more primitives.

4. The computer-implemented method of claim 1, wherein the creating the feature coordinate system comprises, for each of the one or more geometric entities:
   acquiring vertices for all of the one or more primitives extracted from the geometric entity;
   placing the vertices into a vertex collection;
   creating a minimum bounding sphere from the vertex collection; and
   determining an axis of the feature coordinate system.

5. The computer-implemented method of claim 4, wherein the acquiring the vertices comprises:
   for each primitive that is a circle, arc or curve, sampling a number of vertices at equal intervals.

6. The computer-implemented method of claim 4, wherein:
   a center point of the minimum bounding sphere is an origin of the feature coordinate system; and
   a radius of the minimum bounding sphere is a scaling factor that is used during the transforming.

7. The computer-implemented method of claim 4, wherein
   the axis is determined using principal component analysis (PCA);
   the PCA is based on an eigenvector of a covariance matrix of the vertex collection; and
   the PCA uses a vector as a reference that is created from a centroid of the vertex collection to an origin of the feature coordinate to decide an axis direction.

8. The computer-implemented method of claim 1, wherein the encoding comprises:
   encoding the geometry data into a 64-bit binary feature code; and
   combining the encoded geometry data to generate the index code.

9. The computer-implemented method of claim 1, wherein the target geometric entity comprises a single geometric entity and the searching comprises:
   querying the index table using the target index code to identify relevant graph nodes; and
   providing query search results comprising the entity paths recorded in the relevant graph nodes.

10. The computer-implemented method of claim 1, wherein the target geometric entity comprises a composited target geometric entity comprising multiple target geometric entities, and the searching comprises:
   (i) determining a search path comprising multiple steps that define a search sequence of the composited target geometric entity;
   (ii) each of the multiple steps searches for one of the multiple target geometric entities of the composited target geometric entity, wherein for a current geometric entity of the multiple target geometric entities, each of the multiple steps searches by:
      (A) querying the index table to find all instances of the current geometric entity, wherein each found instance provides a beginning of a potential result path;
      (B) searching for potential candidate geometric entities that match the target geometric entity in the next step of the potential result path, wherein the searching for the potential candidate geometric entities comprises:
         (1) calculating a range based on an origin of the current geometric entity;
         (2) querying a spatial tree to find all geometric entities that meet criteria of distance and geometry of the target geometric entity in the next step, wherein all geometric entities that meet the criteria are considered potential candidate geometric entities;
      (C) for each of the potential candidate geometric entities, verifying whether it meets criteria of size and rotation; and
      (D) repeating steps (ii)(B) and (ii)(C) until all geometric entities on the search path and all potential result paths have been determined, wherein the searching aborts and a potential result path is considered non-viable when a potential candidate geometric entity that satisfies the criteria cannot be found.

11. The computer-implemented method of claim 10, wherein the verifying whether it meets criteria of size and rotation comprises:
   calculating a feature code that is based on principal component analysis (PCA) and vertices from both the potential candidate geometric entity and the current geometric entity.

12. A computer-implemented system for searching a computer aided design (CAD) drawing, comprising:
   (a) a computer having a memory;
   (b) a processor executing on the computer;
   (c) the memory storing a set of instructions, wherein the set of instructions, when executed by the processor cause the processor to perform operations comprising:
      (i) obtaining the CAD drawing, wherein
         (A) the CAD drawing comprises one or more geometric entities; and
         (B) the one or more geometric entities comprise vector based geometric entities;
      (ii) for each of the one or more geometric entities:
         (A) extracting one or more primitives;
         (B) creating a graph that holds the geometric entity and all of the one or more primitives owned by that geometric entity, wherein each graph node of the graph records an entity path;
      (iii) creating a feature coordinate system for each of the one or more geometric entities using the one or more primitives;
      (iv) transforming all of the one or more primitives, for all of the one or more geometric entities, from a world coordinate system to feature coordinates of the feature coordinate system, wherein the transforming further comprises making a size of all of the one or more primitives uniform;

(v) encoding, for each of the one or more geometric entities, geometry data of the transformed one or more primitives that are owned by a respective geometric entity, into an index code for the respective geometric entity;
(vi) generating an index table comprising the index codes as keys and graph nodes of the graph as values;
(vii) identifying a target geometric entity of the one or more geometric entities;
(viii) determining, for the target geometric entity, a target index code of the index codes;
(ix) searching the CAD drawing to identify instances of the target geometric entity by querying the index table based on the target index code; and
(x) visually distinguishing the identified instances of the target geometric entity in the CAD drawing.

13. The computer-implemented system of claim 12, wherein the one or more primitives comprise:
a point;
a line;
a circle;
an ellipse;
an arc;
a polyline;
a curve; or
a polygon.

14. The computer-implemented system of claim 12, wherein:
an origin and axis direction of the feature coordinate system is determined by a geometry of the one or more primitives; and
each feature coordinate system is independent of a transformation of the one or more primitives.

15. The computer-implemented system of claim 12, wherein the creating the feature coordinate system comprises, for each of the one or more geometric entities:
acquiring vertices for all of the one or more primitives extracted from the geometric entity;
placing the vertices into a vertex collection;
creating a minimum bounding sphere from the vertex collection; and
determining an axis of the feature coordinate system.

16. The computer-implemented system of claim 15, wherein the acquiring the vertices comprises:
for each primitive that is a circle, arc or curve, sampling a number of vertices at equal intervals.

17. The computer-implemented system of claim 15, wherein:
a center point of the minimum bounding sphere is an origin of the feature coordinate system; and
a radius of the minimum bounding sphere is a scaling factor that is used during the transforming.

18. The computer-implemented system of claim 15, wherein
the axis is determined using principal component analysis (PCA);
the PCA is based on an eigenvector of a covariance matrix of the vertex collection; and
the PCA uses a vector as a reference that is created from a centroid of the vertex collection to an origin of the feature coordinate to decide an axis direction.

19. The computer-implemented system of claim 12, wherein the encoding comprises:
encoding the geometry data into a 64-bit binary feature code; and
combining the encoded geometry data to generate the index code.

20. The computer-implemented system of claim 12, wherein the target geometric entity comprises a single geometric entity and the searching comprises:
querying the index table using the target index code to identify relevant graph nodes; and
providing query search results comprising the entity paths recorded in the relevant graph nodes.

21. The computer-implemented system of claim 12, wherein the target geometric entity comprises a composited target geometric entity comprising multiple target geometric entities, and the searching comprises:
(i) determining a search path comprising multiple steps that define a search sequence of the composited target geometric entity;
(ii) each of the multiple steps searches for one of the multiple target geometric entities of the composited target geometric entity, wherein for a current geometric entity of the multiple target geometric entities, each of the multiple steps searches by:
(A) querying the index table to find all instances of the current geometric entity, wherein each found instance provides a beginning of a potential result path;
(B) searching for potential candidate geometric entities that match the target geometric entity in the next step of the potential result path, wherein the searching for the potential candidate geometric entities comprises:
(1) calculating a range based on an origin of the current geometric entity;
(2) querying a spatial tree to find all geometric entities that meet criteria of distance and geometry of the target geometric entity in the next step, wherein all geometric entities that meet the criteria are considered potential candidate geometric entities;
(C) for each of the potential candidate geometric entities, verifying whether it meets criteria of size and rotation; and
(D) repeating steps (ii)(B) and (ii)(C) until all geometric entities on the search path and all potential result paths have been determined, wherein the searching aborts and a potential result path is considered non-viable when a potential candidate geometric entity that satisfies the criteria cannot be found.

22. The computer-implemented system of claim 21, wherein the verifying whether it meets criteria of size and rotation comprises:
calculating a feature code that is based on principal component analysis (PCA) and vertices from both the potential candidate geometric entity and the current geometric entity.

* * * * *